(12) United States Patent
Fukuzawa

(10) Patent No.: US 12,319,098 B2
(45) Date of Patent: Jun. 3, 2025

(54) TIRE

(71) Applicant: BRIDGESTONE CORPORATION, Tokyo (JP)

(72) Inventor: Kazuyuki Fukuzawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 591 days.

(21) Appl. No.: 17/615,648

(22) PCT Filed: Jun. 19, 2020

(86) PCT No.: PCT/JP2020/024183
§ 371 (c)(1),
(2) Date: Dec. 1, 2021

(87) PCT Pub. No.: WO2020/256124
PCT Pub. Date: Dec. 24, 2020

(65) Prior Publication Data
US 2022/0314713 A1    Oct. 6, 2022

(30) Foreign Application Priority Data
Jun. 21, 2019    (JP) .................... 2019-115378

(51) Int. Cl.
*B60C 19/08*    (2006.01)
(52) U.S. Cl.
CPC .................... *B60C 19/084* (2013.01)
(58) Field of Classification Search
CPC .................................................... B60C 19/084
See application file for complete search history.

(56) References Cited

U.S. PATENT DOCUMENTS

| | | |
|---|---|---|
| 9,409,448 B2 | 8/2016 | Yoshikawa |
| 2010/0078102 A1 | 4/2010 | Nakamura |
| 2012/0152418 A1 | 6/2012 | Nishitani |
| 2012/0234448 A1 | 9/2012 | Asayama |
| 2014/0174612 A1 | 6/2014 | Yoshikawa |
| 2015/0328941 A1 | 11/2015 | Hirosue |
| 2017/0129291 A1 | 5/2017 | Miyasaka |
| 2018/0141383 A1 | 5/2018 | Binder et al. |

(Continued)

FOREIGN PATENT DOCUMENTS

| | | |
|---|---|---|
| CN | 106660285 A | 5/2017 |
| CN | 109835126 A | 6/2019 |

(Continued)

OTHER PUBLICATIONS

Machine translation for Japan 2013-049382 (Year: 2024).*

(Continued)

*Primary Examiner* — Steven D Maki
(74) *Attorney, Agent, or Firm* — Sughrue Mion, PLLC

(57) ABSTRACT

An aspect of a tire of the present invention is a tire provided with a tread portion (11), a sidewall portion (12), and a bead portion (13), the tire includes a bead core (60) which is provided in the bead portion (13), a carcass ply (51) which covers at least a part around a core axis of the bead core (60), and a conductive rubber portion (80) which includes an embedded portion embedded in the carcass ply (51), and at least a part of the embedded portion is located on an outside in a tire radial direction in relation to the bead core (60).

19 Claims, 4 Drawing Sheets

(56) References Cited

U.S. PATENT DOCUMENTS

| | | |
|---|---|---|
| 2018/0178596 A1 | 6/2018 | Kirby et al. |
| 2019/0023083 A1 | 1/2019 | Yanagioka et al. |
| 2019/0160891 A1 | 5/2019 | Park et al. |
| 2020/0180368 A1 | 6/2020 | Yanagioka et al. |

FOREIGN PATENT DOCUMENTS

| | | | |
|---|---|---|---|
| EP | 3 403 855 A1 | | 11/2018 |
| EP | 3 988 347 A1 | | 4/2022 |
| JP | 07-137507 A | | 5/1995 |
| JP | 2012-17035 A | | 1/2012 |
| JP | 2012-131100 A | | 7/2012 |
| JP | 2012-192876 A | | 10/2012 |
| JP | 2013-049382 A | * | 3/2013 |
| JP | 2014-125005 A | | 7/2014 |
| JP | 2014-180868 A | | 9/2014 |
| JP | 2015-020499 A | | 2/2015 |
| JP | 2015-171848 A | | 10/2015 |
| JP | 2019-081401 A | * | 5/2019 |
| WO | 2008/044288 A1 | | 4/2008 |
| WO | 2014/109169 A1 | | 7/2014 |
| WO | 2017/208852 A1 | | 5/2017 |
| WO | 2017/122821 A1 | | 7/2017 |

OTHER PUBLICATIONS

Machine translation for Japan 2019-081401 (Year: 2024).*
International Search Report of PCT/JP2020/024183 dated Sep. 1, 2020 [PCT/ISA/210].
Search Report of Notice of Allowance dated Jan. 4, 2023 from the China National Intellectual Property Administration in CN Application No. 202080041367.1.
Search Report dated Aug. 17, 2022 in Chinese Application No. 202080041367.1.
Extended European Search Report dated May 22, 2023 in Application No. 20826452.3.

* cited by examiner

TIRE

CROSS REFERENCE TO RELATED APPLICATIONS

This application is a National Stage of International Application No. PCT/JP2020/024183, filed Jun. 19, 2020, claiming priority to Japanese Patent Application No. 2019-115378, filed Jun. 21, 2019, the contents of all of which are incorporated herein by reference in their entirety.

TECHNICAL FIELD

The present invention relates to a tire.

BACKGROUND ART

For example, as described in Patent Document 1, a tire including a carcass ply is known.

CITATION LIST

Patent Document

[Patent Document 1]
 Japanese Unexamined Patent Application, First Publication No. 2015-20499

SUMMARY OF INVENTION

Technical Problem

In the above-described tire, it is required to reduce rolling resistance. In order to reduce the rolling resistance, for example, the amount of carbon contained in a carcass rubber of a carcass ply is decreased. However, when the amount of carbon contained in the carcass rubber is decreased, the volume resistivity of the carcass rubber increases and a conductive path from the bead portion to the tread surface portion may be blocked by the carcass ply. Therefore, static electricity transmitted from the vehicle to the bead portion may not be easily released from the tread surface portion to the ground.

In view of the above-described circumstances, an object of an aspect of the present invention is to provide a tire having a structure in which static electricity from a vehicle is easily released to a ground regardless of conductivity of a carcass ply.

Solution to Problem

An aspect of a tire of the present invention is a tire provided with a tread portion, a sidewall portion, and a bead portion, including: a bead core which is provided in the bead portion; a carcass ply which covers at least a part around a core axis of the bead core; and a conductive rubber portion which includes an embedded portion embedded in the carcass ply, wherein at least a part of the embedded portion is located on an outside in a tire radial direction in relation to the bead core.

Effects of Invention

According to an aspect of the present invention, there is provided a tire having a structure in which static electricity from a vehicle is easily released to a ground regardless of conductivity of a carcass ply.

DESCRIPTION OF EMBODIMENTS

Figure 1:
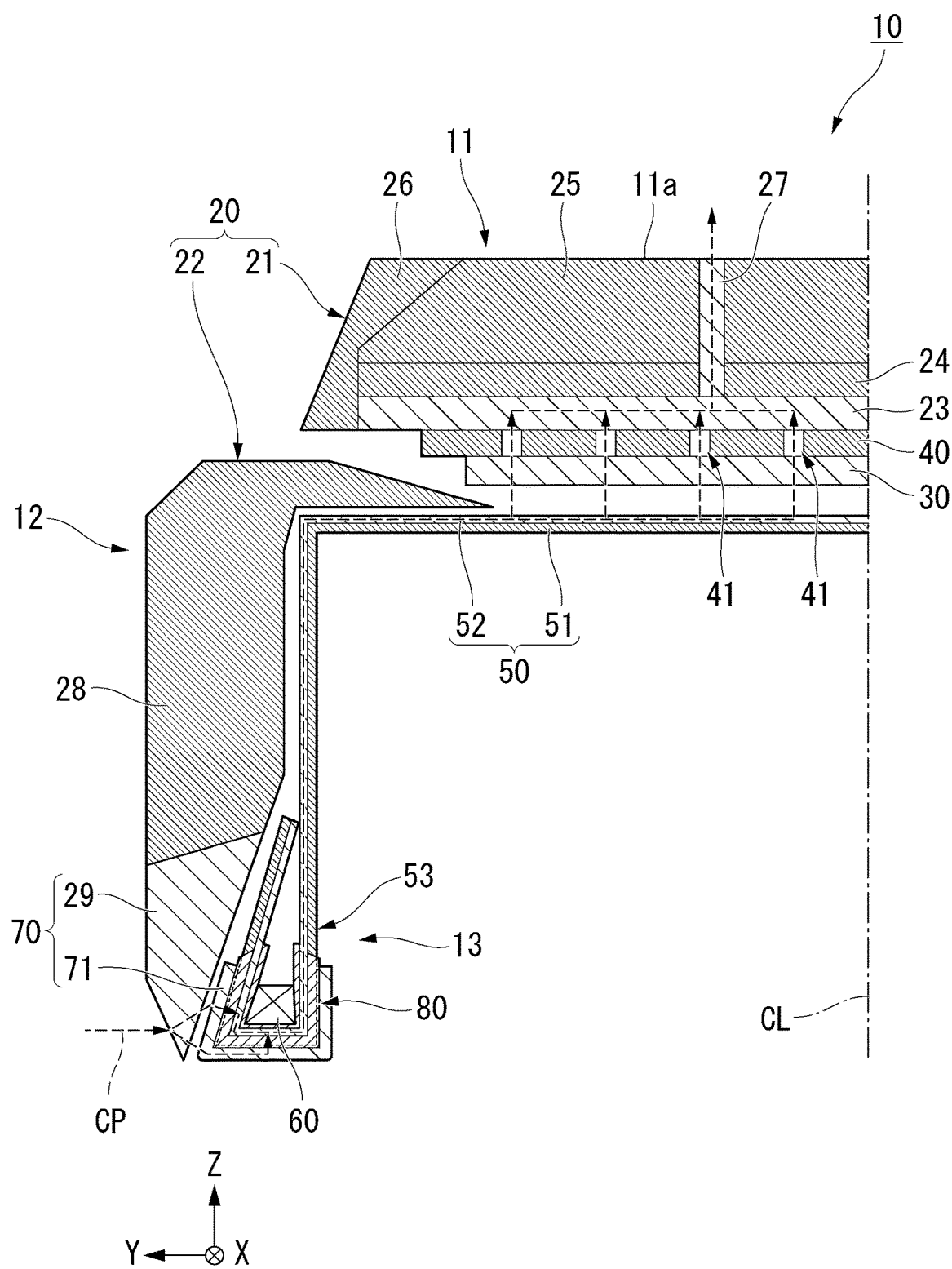
FIG. 1 is a cross-sectional view schematically showing a part of a tire of a first embodiment and is a cross-sectional view in a tire width direction.

Hereinafter, a tire according to an embodiment of the present invention will be described with reference to the drawings. Additionally, the scope of the present invention is not limited to the embodiments below and can be arbitrarily changed in the scope of the technical spirit of the present invention. In the drawings below, the scale and number of each structure may be different from the scale and number of the actual structure in order to make each configuration easy to understand.

The Z-axis direction shown in each drawing is a direction parallel to the tire radial direction centered on the tire rotation axis. In each drawing, the tire radial direction is the up and down direction. In a part of the tire shown in each drawing, the positive side in the Z-axis direction, that is, the upper side in each drawing is the outside in the tire radial direction and the negative side in the Z-axis direction, that is, the lower side in each drawing is the inside in the tire radial direction.

Figure 2:
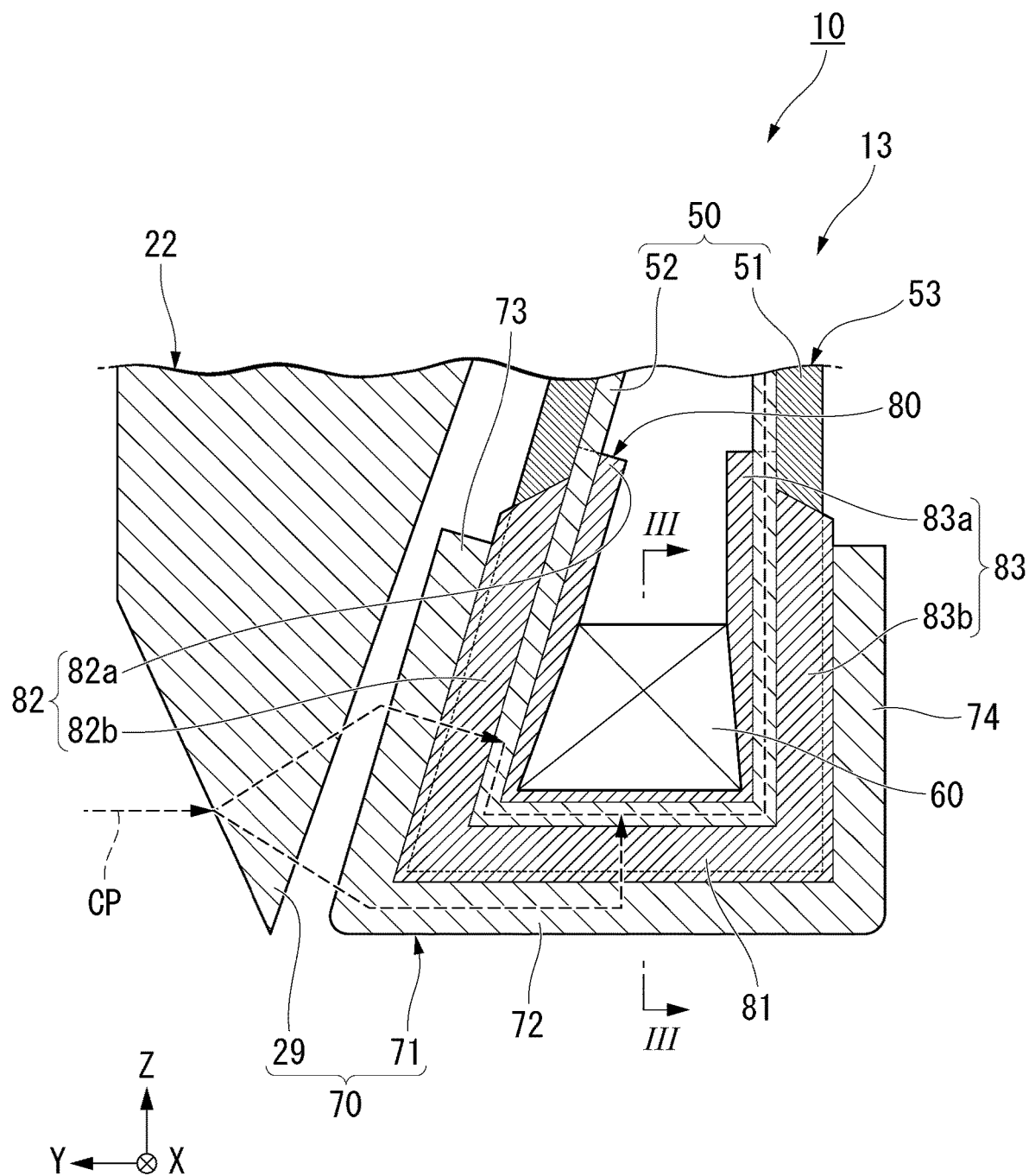
FIG. 2 is a cross-sectional view schematically showing a part of the tire of the first embodiment and is a partially enlarged view of FIG. 1.
Figure 4:
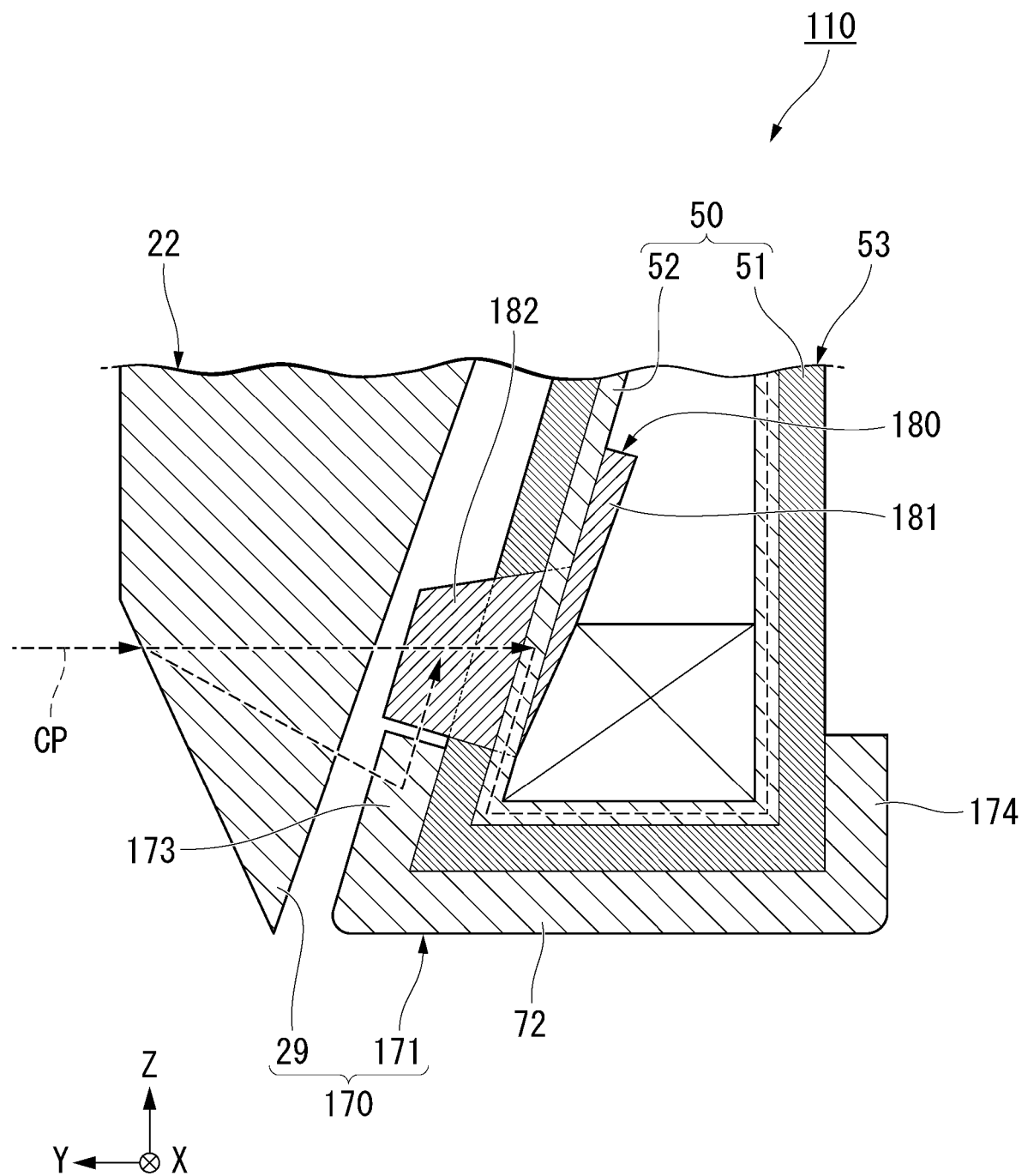
FIG. 4 is a cross-sectional view schematically showing a part of a tire of a second embodiment and is a cross-sectional view in a tire width direction.

The Y-axis direction in each drawing is a direction parallel to the tire width direction. In FIGS. 1, 2, and 4, the tire width direction is the left and right direction. In the following description, for a certain object, the side closer to the tire equatorial portion CL in the tire width direction is referred to as the "inside in the tire width direction" and the side far from the tire equatorial portion CL in the tire width direction is referred to as the "outside in the tire width direction". The tire equatorial portion CL is the center of the tire of each embodiment in the tire width direction. In a part of the tire shown in each drawing, the negative side in the Y-axis direction, that is, for example, the right side in FIGS. 1, 2, and 4 is the inside in the tire width direction and the positive side in the Y-axis direction, that is, for example, the left side in FIGS. 1, 2, and 4 is the outside in the tire width direction.

Further, the circumferential direction around the center axis (that is not shown) of the tire of each embodiment is referred to as the tire circumferential direction. The X-axis direction shown in each drawing is a direction orthogonal to both the Z-axis direction and the Y-axis direction and indicates the circumferential direction in the cross-section of the tire shown in each drawing.

First Embodiment

In FIG. 1, only a portion located on one side in the tire width direction from the tire equatorial portion CL is shown in the cross-section of a part of the tire 10 of this embodiment in the tire circumferential direction. In the cross-section of a part of the tire 10 in the tire circumferential direction, a portion located on the other side in the tire width direction from the tire equatorial portion CL is disposed symmetrically with respect to the portion shown in FIG. 1 in the tire width direction with the tire equatorial portion CL interposed therebetween. In the following description, a portion shown in FIG. 1 of the tire 10 will be described and a portion located on the other side in the tire width direction from the tire equatorial portion CL in the tire 10 will not be described.

The tire 10 of this embodiment includes, as shown in FIG. 1, a tread portion 11, a sidewall portion 12, and a bead portion 13.

The tread portion 11 is disposed on the outside in the tire radial direction in relation to the bead portion 13 and is located at the outer end portion of the tire 10 in the tire radial direction. The tread portion 11 has an annular shape extending in the tire circumferential direction. The tread portion 11 includes a tread surface portion 11a which is a ground contact surface of the tire 10. The tread surface portion 11a is a part of the outer surface of the tread portion 11 in the tire radial direction.

The tread surface portion 11a is, for example, a ground contact surface of the tread portion 11 in a state in which the tire 10 is attached to a standard rim specified in "JATMA Year Book" and the tire 10 is filled with 100% of the internal pressure (hereinafter, referred to as the specified internal pressure) of the air pressure (i.e., maximum air pressure) corresponding to the maximum load capacity (i.e., the bold load in the internal pressure-load capacity correspondence table) in the applicable size and ply rating in "JATMA Year Book" so that the maximum load corresponding to the maximum load capacity is loaded.

Additionally, when the area where the tire 10 is produced or used is other than Japan, the tread surface portion 11a is, for example, a ground contact surface of the tread portion 11 in a state conforming to the industrial standards applying to the area (for example, "TRA Year Book" in the United States, "ETRTO Standard Manual" in Europe, etc.).

The sidewall portion 12 extends inward in the tire radial direction from the outer end portion of the tread portion 11 in the tire width direction. The sidewall portion 12 connects the outer end portion of the tread portion 11 in the tire width direction and the bead portion 13.

The bead portion 13 is connected to the inner end portion of the sidewall portion 12 in the tire radial direction. A bead core 60 is provided in the bead portion 13. More specifically, the bead core 60 is embedded in the bead portion 13.

The tire 10 is provided with a carcass layer 50 which is a skeleton. For example, the tire 10 is formed by assembling a first chafer portion 71, a tire main body 20, a belt layer 30, and a belt reinforcing layer 40 to the carcass layer 50. The carcass layer 50 is provided to straddle the tread portion 11, the sidewall portion 12, and the bead portion 13. The carcass layer 50 has an annular shape extending in the tire circumferential direction. As shown in FIGS. 1 and 2, the carcass layer 50 includes a carcass ply 51 and a conductive portion 52.

Figure 3:
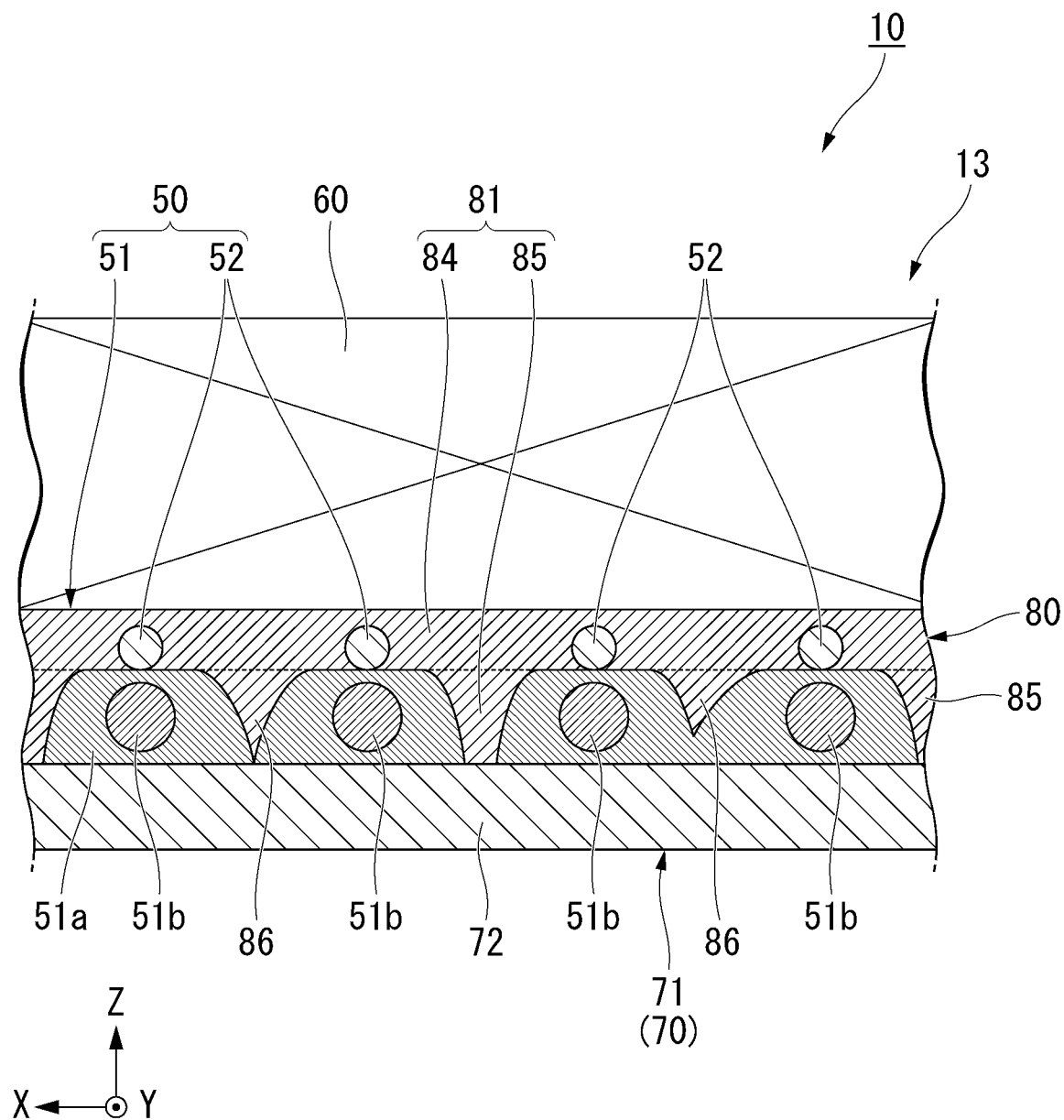
FIG. 3 is a cross-sectional view schematically showing a part of the tire of the first embodiment and is a cross-sectional view taken along the line III-III of FIG. 2.

The carcass ply 51 covers at least a part around the core axis of the bead core 60. In this embodiment, the carcass ply 51 extends from the tread portion 11 to the bead portion 13 through the sidewall portion 12 and is folded outward around the bead core 60 in the tire width direction. The carcass ply 51 has an annular shape extending in the tire circumferential direction. As shown in FIG. 3, the carcass ply 51 includes a carcass rubber 51a and a plurality of ply cords 51b. The carcass ply 51 is formed by embedding the plurality of ply cords 51b in the carcass rubber 51a.

In this embodiment, the loss tangent tan δ of the carcass rubber 51a is relatively small. The loss tangent tan δ becomes smaller as the content of carbon contained in the carcass rubber 51a becomes smaller. The rolling resistance of the tire 10 becomes smaller as the loss tangent tan δ of the carcass rubber 51a becomes smaller. In this embodiment, the carcass rubber 51a is relatively difficult to conduct electricity. Accordingly, in this embodiment, the conductivity of the carcass ply 51 is relatively low.

The plurality of ply cords 51b extend from the tread portion 11 to the bead portion 13 through the sidewall portion 12 and are folded outward in the tire width direction around the bead core 60 while being embedded in the carcass rubber 51a. The plurality of ply cords 51b are arranged at intervals in the tire circumferential direction. The ply cord 51b is, for example, an organic fiber cord or the like.

The carcass ply 51 includes a main body of which at least a part is located on the inside in the tire width direction of the bead core 60 and a folded portion which is folded outward in the tire width direction around the bead core 60 from the main body. The main body is a portion which extends from the tread portion 11 to the inside in the tire width direction of the bead portion 13 through the sidewall portion 12 in the carcass ply 51. The folded portion is a portion which is folded outward in the tire width direction around the bead core 60 and extends in the tire radial direction on the outside in the tire width direction of the bead core 60.

The conductive portion 52 is provided on the outer surface of the carcass ply 51. The conductive portion 52 extends along the carcass ply 51 as shown in FIG. 1. The conductive portion 52 is located on the outside in the tire radial direction of the carcass ply 51 in the tread portion 11. In this embodiment, the conductive portion 52 extends from the tread portion 11 to the inside in the tire width direction of at least the bead core 60. In this embodiment, the conductive portion 52 extends from the tread portion 11 to the bead portion 13 through the sidewall portion 12, is folded outward in the tire width direction around the bead core 60, and extends to the outside in the tire width direction of the bead core 60.

The outer end portion in the tire radial direction of the portion folded around the bead core 60 in the conductive portion 52 is disposed at the same position in the tire radial direction as the outer end portion in the tire radial direction of the portion folded around the bead core 60 in the carcass ply 51. At least a part of the conductive portion 52 is located between the carcass ply 51 and the bead core 60. In this embodiment, in the conductive portion 52, a portion which is located on the inside in the tire radial direction of the bead core 60 and portions which are located on both sides of the bead core 60 in the tire width direction are located between the carcass ply 51 and the bead core 60. In this embodiment, the conductive portion 52 is connected to a conductive rubber portion 80 to be described later. The conductive portion 52 in the bead portion 13 is provided inside the carcass ply 51 folded around the bead core 60. As shown in FIG. 3, the plurality of conductive portions 52 are attached to the outer surface of the carcass rubber 51a in the tire radial direction on the inside in the tire radial direction of the bead core 60.

In this embodiment, the conductive portion 52 is a thread-shaped member containing metal. The conductive portion 52 is, for example, a conductive thread in which a metal fiber such as stainless steel is wound around an organic fiber. A plurality of the conductive portions 52 are provided at intervals in the tire circumferential direction.

Additionally, FIG. 3 shows a state in which the plurality of conductive portions 52 are respectively located on the outside in the tire radial direction of the plurality of ply cords 51b as an example, but the present invention is not limited thereto. The positional relationship between the plurality of conductive portions 52 and the plurality of ply cords 51b in the tire circumferential direction is not particularly limited. That is, in FIG. 3, the position of the conductive portion 52 in the left and right direction may deviate from the position of the ply cord 51b in the left and right direction. Further, the number of the conductive portions 52 and the number of the ply cords 51b may be the same or different.

The conductive portion 52 has conductivity. The volume resistivity of the conductive portion 52 is smaller than the volume resistivity of the conductive rubber portion 80 to be described later.

In the present specification, "a member has conductivity" and "a member is relatively easy to conduct electricity" means that the volume resistivity of a member is low enough to allow static electricity from the vehicle to flow.

The first chafer portion 71 has conductivity. The first chafer portion 71 is a rubber member or a composite member of fibers and rubber. As shown in FIG. 2, the first chafer portion 71 covers a portion provided in the bead portion 13 in the carcass ply 51 from the inside in the tire radial direction and both sides in the tire width direction. The portion provided in the bead portion 13 in the carcass ply 51 includes a portion which covers the bead core 60 in the carcass ply 51 from the inside in the tire radial direction and both sides in the tire width direction. In the following description, the portion provided in the bead portion 13 in the carcass ply 51 is referred to as a core covering portion 53. The core covering portion 53 passes through the bead core 60 in the tire radial direction from the inside in the tire width direction of the bead core 60 and extends to the outside in the tire width direction of the bead core 60. The first chafer portion 71 has an annular shape extending in the tire circumferential direction.

The first chafer portion 71 includes a radial covering portion 72 and lateral covering portions 73 and 74. The radial covering portion 72 is a portion which covers the core covering portion 53 in the carcass ply 51 from the inside in the tire radial direction. The radial covering portion 72 extends in the tire width direction. The lateral covering portions 73 and 74 are portions which cover the core covering portion 53 in the carcass ply 51 from both sides in the tire width direction. The lateral covering portion 73 extends from the outer end portion of the radial covering portion 72 in the tire width direction to the outside in the tire radial direction and covers the core covering portion 53 from the outside in the tire width direction. The lateral covering portion 74 extends from the inner end portion of the radial covering portion 72 in the tire width direction to the outside in the tire radial direction and covers the core covering portion 53 from the inside in the tire width direction. The outer end portions of the lateral covering portions 73 and 74 in the tire radial direction are located on the inside in the tire radial direction in relation to the outer end portion in the tire radial direction of the portion folded around the bead core 60 in the carcass ply 51.

The tire main body 20 includes, as shown in FIG. 1, a tread rubber 21 and a sidewall rubber 22.

The tread rubber 21 is a portion that constitutes a part of the tread portion 11 and has an annular shape extending in the tire circumferential direction. The tread rubber 21 is provided on the outside in the tire radial direction of the carcass layer 50. The tread rubber 21 is connected to the carcass layer 50 through the belt layer 30 and the belt reinforcing layer 40. In FIG. 1, in order to easily and schematically understand each portion, the carcass layer 50, the tread rubber 21, the belt layer 30, and the belt reinforcing layer 40 are separated.

The tread rubber 21 includes a tread under cushion 23, a base layer 24, a cap layer 25, a mini side 26, and an antenna rubber 27.

The tread under cushion 23, the base layer 24, and the cap layer 25 are laminated in this order from the inside in the tire radial direction toward the outside in the tire radial direction. The outer surface of the cap layer 25 in the tire radial direction constitutes the tread surface portion 11a. The mini side 26 is connected to the outer end portions of the tread under cushion 23, the base layer 24, and the cap layer 25 in the laminated state in the tire width direction.

The antenna rubber 27 is embedded to straddle the base layer 24 and the cap layer 25. The antenna rubber 27 penetrates the base layer 24 and the cap layer 25 in the tire radial direction. The inner end portion of the antenna rubber 27 in the tire radial direction is connected to the outer surface of the tread under cushion 23 in the tire radial direction. The outer end portion of the antenna rubber 27 in the tire radial direction is exposed to the outer surface of the cap layer 25 in the tire radial direction and constitutes a part of the tread surface portion 11a. The antenna rubber 27 may extend intermittently, may extend continuously, or may be scattered in the tire circumferential direction.

The base layer 24, the cap layer 25, and the mini side 26 are relatively difficult to conduct electricity, and the base layer 24, the cap layer 25, and the mini side 26 have low conductivity. The tread under cushion 23 and the antenna rubber 27 are relatively easy to conduct electricity and have conductivity.

The sidewall rubber 22 is a portion that constitutes a part of the sidewall portion 12 and a part of the bead portion 13 and has an annular shape extending in the tire circumferential direction. The sidewall rubber 22 is provided on the outside in the tire width direction of the carcass layer 50. The sidewall rubber 22 is connected to the carcass layer 50. The outer end portion of the sidewall rubber 22 in the tire radial direction is connected to the outer end portion of the tread rubber 21 in the tire width direction. In FIG. 1, in order to easily and schematically understand each portion, the sidewall rubber 22 and the carcass layer 50 are separated and the sidewall rubber 22 and the tread rubber 21 are separated.

The sidewall rubber 22 includes a sidewall rubber main body 28 and a second chafer portion 29.

The sidewall rubber main body 28 is a portion that constitutes a part of the sidewall portion 12. The outer end portion of the sidewall rubber main body 28 in the tire radial direction extends inward in the tire width direction and is located between the carcass layer 50 and the tread rubber 21, the belt layer 30, and the belt reinforcing layer 40.

The second chafer portion 29 is a portion that constitutes a part of the bead portion 13. The second chafer portion 29 is connected to the inner end portion of the sidewall rubber main body 28 in the tire radial direction. The second chafer portion 29 covers the core covering portion 53 of the carcass layer 50 from the outside in the tire width direction. The second chafer portion 29 is connected to the core covering portion 53 and the lateral covering portion 73 of the first chafer portion 71 from the outside in the tire width direction. Additionally, in FIGS. 1 and 2, in order to easily and schematically understand each portion, the second chafer portion 29 and the core covering portion 53 are separated and the second chafer portion 29 and the lateral covering portion 73 are separated.

The rubber material constituting the sidewall rubber main body 28 and the rubber material constituting the second chafer portion 29 have different volume resistivities. The sidewall rubber main body 28 is relatively difficult to conduct electricity. The second chafer portion 29 is relatively easy to conduct electricity and has conductivity.

In this embodiment, the first chafer portion 71 and the second chafer portion 29 constitute a chafer portion 70. That is, in this embodiment, the tire 10 includes the chafer portion 70 which covers at least a part around the carcass ply 51. In this embodiment, the chafer portion 70 covers at least the outside in the tire width direction of the core covering portion 53. The chafer portion 70 has conductivity. In the chafer portion 70, the volume resistivity of the first chafer portion 71 and the volume resistivity of the second chafer portion 29 may be the same or different. In this embodiment, the chafer portion 70 covers the inside in the tire radial direction and both sides in the tire width direction of the core covering portion 53 and is connected to the core covering portion 53. The chafer portion 70 is a portion which protects the carcass layer 50 from the friction with the rim to which the tire 10 is attached.

The belt layer 30 is embedded in the tread portion 11. The belt layer 30 is laminated on the outside in the tire radial direction of the carcass layer 50. The belt layer 30 is connected to the carcass ply 51 and the conductive portion 52. The belt layer 30 is located between the tread rubber 21 and the carcass layer 50 in the tire radial direction. Although not shown in the drawings, the belt layer 30 is formed by embedding a plurality of steel cords in the belt rubber. The belt rubber of the belt layer 30 is relatively easy to conduct electricity and has conductivity. Accordingly, the belt layer 30 has conductivity.

The belt reinforcing layer 40 is laminated on the outside in the tire radial direction of the belt layer 30. The belt reinforcing layer 40 is located between the tread rubber 21 and the belt layer 30 in the tire radial direction. The outer surface of the belt reinforcing layer 40 in the tire radial direction is connected to the inner surface of the tread under cushion 23 in the tread rubber 21 in the tire radial direction.

The belt reinforcing layer 40 is formed by, for example, winding a composite cord made of rubber and nylon around the outer peripheral portion of the belt layer 30 a plurality of times. These rolls of the composite cord constituting the belt reinforcing layer 40 are arranged with a gap 41 therebetween in the tire width direction. Although not shown in the drawings, the tread under cushion 23 and the belt layer 30 which sandwich the belt reinforcing layer 40 in the tire radial direction are connected to each other in the gap 41 between these rolls of the belt reinforcing layer 40. The belt reinforcing layer 40 is relatively difficult to conduct electricity.

As shown in FIG. 2, the bead portion 13 is provided with the conductive rubber portion 80. The conductive rubber portion 80 is relatively easy to conduct electricity and has conductivity. The volume resistivity of the conductive rubber portion 80 is smaller than the volume resistivity of the carcass rubber 51a. The volume resistivity of the conductive rubber portion 80 is smaller than, for example, the volume resistivity of the first chafer portion 71 and the volume resistivity of the second chafer portion 29. The volume resistivity of the conductive rubber portion 80 is different from, for example, the volume resistivity of the other rubber material constituting the bead portion 13.

Additionally, the volume resistivity of the conductive rubber portion 80 may be the same as the volume resistivity of the first chafer portion 71 and the volume resistivity of the second chafer portion 29 or may be larger than the volume resistivity of the first chafer portion 71 and the volume resistivity of the second chafer portion 29.

The conductive rubber portion 80 is disposed to penetrate the core covering portion 53 from the inside of the core covering portion 53 and straddle the outside of the core covering portion 53. The conductive rubber portion 80 has an annular shape extending in the tire circumferential direction. The conductive rubber portion 80 includes a first portion 81, a second portion 82, and a third portion 83.

The first portion 81 is located on the inside in the tire radial direction of the bead core 60. The first portion 81 extends in the tire width direction. The first portion 81 is disposed to penetrate the carcass layer 50 in the tire radial direction. The outer end portion of the first portion 81 in the tire radial direction contacts the bead core 60. The inner end portion of the first portion 81 in the tire radial direction is connected to the first chafer portion 71. More specifically, the inner end portion of the first portion 81 in the tire radial direction is connected to the radial covering portion 72 of the first chafer portion 71. The first portion 81 includes, as shown in FIG. 3, a base portion (i.e., intervening portion) 84 and a through-portion 85.

The base portion 84 is laminated on the outside in the tire radial direction of the carcass ply 51. The conductive portion 52 is embedded in the base portion 84. Accordingly, the first portion 81 is connected to the conductive portion 52. In this embodiment, the base portion 84 corresponds to an intervening portion which is located between the bead core 60 and the carcass ply 51.

The through-portion 85 extends inward in the tire radial direction from the base portion 84. For example, a plurality of the through-portions 85 are provided in the tire circumferential direction. The through-portion 85 penetrates a portion located between the ply cords 51b in the carcass rubber 51a in the tire radial direction. In this embodiment, the through-portion 85 divides the carcass rubber 51a in the tire circumferential direction. The inner end portion of the through-portion 85 in the tire radial direction is connected to the radial covering portion 72 of the first chafer portion 71. The dimension of the through-portion 85 in the tire radial direction is larger than the dimension of the base portion 84 in the tire radial direction.

As described above, since the first portion 81 connects the conductive portion 52 and the first chafer portion 71 on the inside in the tire radial direction of the bead core 60, the conductive rubber portion 80 is disposed to penetrate the carcass ply 51 in the tire radial direction on the inside in the tire radial direction of the bead core 60 and connects the conductive portion 52 and the chafer portion 70. Further, the conductive rubber portion 80 penetrates a gap between the ply cords 51b, which are adjacent to each other in the tire circumferential direction, in the tire radial direction and connects the conductive portion 52 and the chafer portion 70.

As shown in FIG. 2, the second portion 82 is located on the outside in the tire width direction of the bead core 60. The second portion 82 extends outward in the tire radial direction from the outer end portion of the first portion 81 in the tire width direction. More specifically, the second portion 82 is located on the outside in the tire radial direction from the outer end portion of the first portion 81 in the tire width direction and obliquely extends inward in the tire width direction. The outer end portion of the second portion 82 in the tire radial direction is located on the outside in the tire radial direction in relation to the first chafer portion 71. The conductive portion 52 is embedded in the second portion 82. Accordingly, the second portion 82 is connected to the conductive portion 52.

The second portion 82 is disposed to penetrate the carcass layer 50 in the tire width direction. The second portion 82 includes a base portion (i.e., intervening portion) 82a and a through-portion (i.e., embedded portion) 82b. In this embodiment, the base portion 82a corresponds to an intervening portion which is located between the bead core 60 and the carcass ply 51. The base portion 82a is a portion which is located on the inside in the tire width direction in relation to the carcass ply 51 in the second portion 82. In this embodiment, the through-portion 82b corresponds to an embedded portion which is embedded in the carcass ply 51. More specifically, the through-portion 82b corresponds to a first embedded portion which is embedded in the folded portion of the carcass ply 51. The through-portion 82b penetrates a portion located at the folded portion in the carcass rubber 51a in the tire width direction.

The outer portion of the through-portion 82b in the tire radial direction is located on the outside in the tire radial direction in relation to the bead core 60. That is, at least a part of the through-portion 82b which is the embedded portion is located on the outside in the tire radial direction in relation to the bead core 60. The distance from the outer end portion of the bead core 60 in the tire radial direction to the outer end portion of the through-portion 82b which is the embedded portion in the tire radial direction is equal to or shorter than the dimension of the bead core 60 in the tire radial direction.

In the present specification, the "embedded portion is embedded in the carcass ply" includes that the embedded portion is embedded in the carcass rubber of the carcass ply. In this embodiment, the through-portion 82b which is the embedded portion is embedded in the carcass rubber 51a.

Since the base portion 82a and the through-portion 82b are provided, the inner end portion of the second portion 82 in the tire width direction contacts the bead core 60. The outer end portion of the second portion 82 in the tire width direction is connected to the first chafer portion 71. More specifically, the outer end portion of the second portion 82 in the tire width direction is connected to the lateral covering portion 73 of the first chafer portion 71. Similarly to the first portion 81 shown in FIG. 3, the second portion 82 penetrates a gap between the ply cords 51b, which are adjacent to each other in the tire circumferential direction, in the tire width direction and connects the conductive portion 52 and the chafer portion 70.

The dimension of the portion located on the inside in the tire width direction in relation to the carcass ply 51 in the second portion 82, that is, the dimension of the base portion 82a which is the intervening portion in the tire width direction becomes smaller inward in the tire radial direction at the inner portion in the tire radial direction.

The third portion 83 is located on the inside in the tire width direction of the bead core 60. The third portion 83 extends outward in the tire radial direction from the inner end portion of the first portion 81 in the tire width direction. The outer end portion of the third portion 83 in the tire radial direction is located on the outside in the tire radial direction in relation to the first chafer portion 71. The conductive portion 52 is embedded in the third portion 83. Accordingly, the third portion 83 is connected to the conductive portion 52.

The third portion 83 is disposed to penetrate the carcass layer 50 in the tire width direction. The third portion 83 includes a base portion (i.e., intervening portion) 83a and a through-portion (i.e., embedded portion) 83b. In this embodiment, the base portion 83a corresponds to an intervening portion which is located between the bead core 60 and the carcass ply 51. The base portion 83a is a portion which is located on the outside in the tire width direction in relation to the carcass ply 51 in the third portion 83. In this embodiment, the through-portion 83b corresponds to an embedded portion which is embedded in the carcass ply 51. More specifically, the through-portion 83b corresponds to a second embedded portion which is embedded in the main body of the carcass ply 51. The through-portion 83b penetrates a portion located between the ply cords 51b in the carcass rubber 51a in the tire width direction.

The outer portion of the through-portion 83b in the tire radial direction is located on the outside in the tire radial direction in relation to the bead core 60. That is, at least a part of the through-portion 83b which is the embedded portion is located on the outside in the tire radial direction in relation to the bead core 60. The distance from the outer end portion of the bead core 60 in the tire radial direction to the outer end portion of the through-portion 83b which is the embedded portion in the tire radial direction is equal to or shorter than the dimension of the bead core 60 in the tire radial direction.

Since the base portion 83a and the through-portion 83b are provided, the outer end portion of the third portion 83 in the tire width direction contacts the bead core 60. The inner end portion of the third portion 83 in the tire width direction is connected to the first chafer portion 71. More specifically, the inner end portion of the third portion 83 in the tire width direction is connected to the lateral covering portion 74 of the first chafer portion 71. Similarly to the first portion 81 shown in FIG. 3, the third portion 83 penetrates a gap between the ply cords 51b, which are adjacent to each other in the tire circumferential direction, in the tire width direction and connects the conductive portion 52 and the chafer portion 70.

The dimension of the portion which is located on the outside in the tire width direction in relation to the carcass ply 51 in the third portion 83, that is, the dimension of the base portion 83a which is the intervening portion in the tire width direction becomes smaller inward in the tire radial direction at the inner portion in the tire width direction.

As described above, since the second portion 82 connects the conductive portion 52 and the first chafer portion 71 on the outside in the tire width direction of the bead core 60, the conductive rubber portion 80 is disposed to penetrate the carcass ply 51 in the tire width direction on the outside in the tire width direction of the bead core 60 and connects the conductive portion 52 and the chafer portion 70. Further, since the third portion 83 connects the conductive portion 52 and the first chafer portion 71 on the inside in the tire width direction of the bead core 60, the conductive rubber portion 80 is disposed to penetrate the carcass ply 51 in the tire width direction on the inside in the tire width direction of the bead core 60 and connects the conductive portion 52 and the chafer portion 70. Further, the conductive rubber portion 80 penetrates a gap between the ply cords 51b, which are adjacent to each other in the tire circumferential direction, in the tire width direction and connects the conductive portion 52 and the chafer portion 70.

In this embodiment, the dimension of the conductive rubber portion 80 in the tire width direction becomes larger inward in the tire radial direction. That is, the dimension in the tire width direction of the inner portion of the conductive rubber portion 80 in the tire radial direction increases.

As shown in FIG. 1, the tire 10 is provided with a conductive path CP along which static electricity from the vehicle is released from the rim to which the tire 10 is attached to the ground. The conductive path CP is a path through which static electricity transmitted from the rim in the tire 10 passes and extends from the second chafer portion 29 to the tread surface portion 11a while passing through the first chafer portion 71, the conductive rubber portion 80, the conductive portion 52, the belt layer 30, the gap 41 of the belt reinforcing layer 40, the tread under cushion 23, and the antenna rubber 27 in this order. Accordingly, static electricity of the vehicle transmitted from the rim can be released from the tread surface portion 11a to the ground.

Additionally, as shown in FIG. 2, in this embodiment, the conductive path CP from the first chafer portion 71 to the conductive portion 52 through the conductive rubber portion 80 includes, for example, a path through which static electricity flows from the radial covering portion 72 to the conductive portion 52 through the first portion 81 and a path through which static electricity flows from the lateral covering portion 73 to the conductive portion 52 through the second portion 82.

Further, as described above, the tread under cushion 23 and the belt layer 30 are connected to each other in the gap 41 of the belt reinforcing layer 40. Therefore, static electricity flowing from the conductive portion 52 to the belt layer 30 flows from the gap 41 to the tread under cushion 23.

According to this embodiment, the through-portions 82b and 83b which are the embedded portions in the conductive rubber portion 80 are embedded in the carcass ply 51. That is, a part of the conductive rubber portion 80 is embedded in the carcass ply 51. Therefore, electricity can be easily conducted through the conductive rubber portion 80 in the portion in which the conductive rubber portion 80 is embedded in the carcass ply 51. Accordingly, even when the conductivity of the carcass ply 51 is low, static electricity from the vehicle can pass through the carcass ply 51 by the conductive rubber portion 80. Thus, it is possible to obtain the tire 10 having a structure in which static electricity from the vehicle is easily released to the ground regardless of the conductivity of the carcass ply 51. Therefore, it is possible to preferably release static electricity of the vehicle to the ground while reducing the rolling resistance of the tire 10 by decreasing the amount of carbon contained in the carcass rubber 51a of the carcass ply 51.

Further, according to this embodiment, the through-portion 82b which is the first embedded portion is embedded in the folded portion which is located on the outside in the tire width direction of the bead core 60 in the carcass ply 51. Therefore, a portion in which the conductive rubber portion 80 is embedded in the carcass ply 51 easily contacts the lateral covering portion 73 of the first chafer portion 71. Accordingly, static electricity from the vehicle transmitted from the rim to the chafer portion 70 can be easily passed through the carcass ply 51 by the conductive rubber portion 80 (the through-portion 82b). Thus, static electricity from the vehicle is more preferably easily released to the ground.

Further, according to this embodiment, the through-portion 83b which is the second embedded portion is embedded in the main body which is located on the inside in the tire width direction of the bead core 60 in the carcass ply 51. Therefore, a portion in which the conductive rubber portion 80 is embedded in the carcass ply 51 easily contacts the lateral covering portion 74 of the first chafer portion 71. Accordingly, static electricity from the vehicle transmitted from the rim to the chafer portion 70 can be easily passed through the carcass ply 51 by the conductive rubber portion 80 (the through-portion 83b). Thus, static electricity from the vehicle is more preferably easily released to the ground.

Further, according to this embodiment, the distance from the outer end portion of the bead core 60 in the tire radial direction to the outer end portions of the through-portions 82b and 83b which are the embedded portions in the tire radial direction is equal to or shorter than the dimension of the bead core 60 in the tire radial direction. Therefore, it is possible to decrease the volume of the conductive rubber portion 80.

Further, according to this embodiment, the conductive portion 52 is provided to extend along the carcass ply 51 and to be located between the carcass ply 51 and the bead core 60. Further, the conductive portion 52 is connected to the conductive rubber portion 80. Therefore, static electricity transmitted to the conductive rubber portion 80 can be transmitted to the conductive portion 52. Accordingly, even when the volume resistivity of the carcass rubber 51a of the carcass ply 51 is relatively large and the conductivity of the carcass ply 51 is low, static electricity from the vehicle transmitted from the rim to the chafer portion 70 can be transmitted to the conductive portion 52 through the conductive rubber portion 80. Accordingly, static electricity from the vehicle can be sent to the tread portion 11 through the conductive portion 52 and the static electricity can be released from the tread surface portion 11a of the tread portion 11 to the ground. Thus, static electricity from the vehicle is more preferably easily released to the ground.

Further, according to this embodiment, the volume resistivity of the conductive portion 52 is smaller than the volume resistivity of the conductive rubber portion 80. Therefore, it is easy to preferably decrease the volume resistivity of the conductive portion 52. Accordingly, static electricity can preferably flow to the conductive portion 52 that makes the relatively long conductive path CP from the bead portion 13 to the tread portion 11. Thus, static electricity from the vehicle is more easily released to the ground.

Further, according to this embodiment, the conductive portion 52 is a thread-shaped member containing metal. Therefore, the volume resistivity of the conductive portion 52 is more preferably easily decreased and static electricity more easily flows from the bead portion 13 to the tread portion 11 by the conductive portion 52. Accordingly, static electricity from the vehicle is more easily released to the ground. Further, according to this embodiment, the plurality of conductive portions 52 are arranged at intervals in the tire circumferential direction. Therefore, the conductive path CP through which static electricity flows from the bead portion 13 to the tread portion 11 can be increased and static electricity more easily flows from the bead portion 13 to the tread portion 11 by the conductive portion 52. Accordingly, static electricity from the vehicle is more easily released to the ground.

Further, according to this embodiment, the through-portions 82b and 83b which are the embedded portions are located between the ply cords 51b which are adjacent to each other in the tire circumferential direction. Therefore, a part of the conductive rubber portion 80 is easily disposed to be embedded in the carcass ply 51. Further, the through-portions 82b and 83b are easily arranged to penetrate the carcass ply 51 and the conductive portion 52 and the chafer portion 70 are more preferably easily connected by the conductive rubber portion 80.

According to this embodiment, the bead portion 13 is provided with the conductive rubber portion 80 which penetrates the carcass ply 51 in the tire width direction and connects the conductive portion 52 and the chafer portion 70. Therefore, even when the volume resistivity of the carcass rubber 51a of the carcass ply 51 is relatively large and the conductivity of the carcass ply 51 is low, static electricity from the vehicle transmitted from the rim to the chafer portion 70 can be transmitted to the conductive portion 52 through the conductive rubber portion 80. Accordingly, static electricity from the vehicle can be sent to the tread portion 11 through the conductive portion 52 and the static electricity can be released from the tread surface portion 11a of the tread portion 11 to the ground. Thus, according to this embodiment, it is possible to obtain the tire 10 having a structure in which static electricity from the vehicle is easily released to the ground regardless of the conductivity of the carcass ply 51. Accordingly, it is possible to more preferably release static electricity of the vehicle to the ground while reducing the rolling resistance of the tire 10 by decreasing the amount of carbon contained in the carcass rubber 51a of the carcass ply 51.

Further, according to this embodiment, the conductive rubber portion 80 is disposed to penetrate the carcass ply 51 in the tire width direction on the outside and the inside in the tire width direction of the bead core 60 and connects the conductive portion 52 and the chafer portion 70. Therefore, the connection area between the chafer portion 70 and the conductive portion 52 through the conductive rubber portion 80 can be increased and static electricity from the chafer portion 70 can more preferably flow to the conductive portion 52 through the conductive rubber portion 80. Thus, static electricity from the vehicle is more easily released to the ground.

Further, according to this embodiment, the conductive rubber portion 80 penetrates a gap between the ply cords 51b which are adjacent to each other in the tire circumferential direction and connects the conductive portion 52 and the chafer portion 70. Therefore, the conductive rubber portion 80 can be easily disposed to penetrate the carcass ply 51 and more preferably connect the conductive portion 52 and the chafer portion 70 by the conductive rubber portion 80.

Further, according to this embodiment, the carcass rubber 51a is relatively difficult to conduct electricity. Therefore, it is difficult for static electricity from the vehicle to pass through the carcass ply 51. However, as described above, according to this embodiment, static electricity from the vehicle is easily released to the ground regardless of the conductivity of the carcass ply 51. That is, the effect that static electricity is easily released to the ground regardless of the conductivity of the carcass ply 51 can be obtained more usefully in a configuration in which the carcass rubber 51a is relatively difficult to conduct electricity.

Further, according to this embodiment, the conductive rubber portion 80 is disposed to penetrate the carcass ply 51 in the tire radial direction on the inside in the tire radial direction of the bead core 60 and connects the conductive portion 52 and the chafer portion 70. Therefore, the conductive rubber portion 80 is disposed to penetrate the carcass ply 51 on the inside in the tire radial direction and both sides in the tire width direction of the bead core 60 and connects the conductive portion 52 and the chafer portion 70. Accordingly, a connection area between the chafer portion 70 and the conductive portion 52 through the conductive rubber portion 80 can be further increased and static electricity from the chafer portion 70 can more preferably flow to the conductive portion 52 through the conductive rubber portion 80. Thus, static electricity from the vehicle is more easily released to the ground.

Further, according to this embodiment, the dimension in the tire width direction of the inner portion of the conductive rubber portion 80 in the tire radial direction increases. Therefore, a portion connected to the chafer portion 70 at the inner end portion of the conductive rubber portion 80 in the tire radial direction can be increased in the tire width direction. Accordingly, the conductive rubber portion 80 and the chafer portion 70 are more preferably connected and static electricity easily flows from the chafer portion 70 to the conductive portion 52 through the conductive rubber portion 80. Thus, static electricity from the vehicle is more easily released to the ground.

Further, according to this embodiment, the conductive rubber portion 80 connects the conductive portion 52 and the first chafer portion 71. The first chafer portion 71 covers a portion provided in the bead portion 13 in the carcass ply 51 from the inside in the tire radial direction and both sides in the tire width direction. Therefore, it is easy to adopt the above-described configuration in which the conductive rubber portion 80 is disposed to penetrate the carcass ply 51 on the inside in the tire radial direction and both sides in the tire width direction of the bead core 60 and connects the conductive portion 52 and the chafer portion 70. That is, as in this embodiment, the lateral covering portions 73 and 74 and the conductive portion 52 are easily connected by the second portion 82 and the third portion 83 of the conductive rubber portion 80 while connecting the radial covering portion 72 and the conductive portion 52 by the first portion 81 of the conductive rubber portion 80.

Second Embodiment

In this embodiment, the configuration of the conductive rubber portion is different from that of the first embodiment. In addition, the same configuration as the above-described embodiment is appropriately denoted by the same reference numeral and the description may be omitted.

In a tire 110 of this embodiment, a chafer portion 170 includes a first chafer portion 171 and the second chafer portion 29 as shown in FIG. 4.

The first chafer portion 171 includes the radial covering portion 72 and lateral covering portions 173 and 174.

The outer end portions of the lateral covering portions 173 and 174 in the tire radial direction are located on the inside in the tire radial direction in relation to the outer end portions of the lateral covering portions 73 and 74 in the tire radial direction of the first embodiment. The outer end portions of the lateral covering portions 173 and 174 in the tire radial direction are located on the inside in the tire radial direction in relation to the outer end portion of the bead core 60 in the tire radial direction.

A conductive rubber portion 180 of this embodiment extends in the tire radial direction on the outside in the tire width direction of the bead core 60. An outer portion 181 of the conductive rubber portion 180 in the tire radial direction is the same as the base portion 82a of the second portion 82 of the conductive rubber portion 80 of the first embodiment.

An inner portion 182 of the conductive rubber portion 180 in the tire radial direction is disposed to penetrate the carcass ply 51 in the tire width direction on the outside in the tire width direction of the bead core 60. The outer end portion of the inner portion 182 in the tire width direction is connected to the second chafer portion 29. The inner end portion in the tire radial direction at the outer end portion of the inner portion 182 in the tire width direction is connected to the outer end portion of the lateral covering portion 173 of the first chafer portion 171 in the tire radial direction.

In FIG. 4, in order to easily and schematically understand each portion, the second chafer portion 29 and the inner portion 182 of the conductive rubber portion 180 are separated and the inner portion 182 and the lateral covering portion 173 are separated.

With the above-described arrangement, the conductive rubber portion 180 is disposed to penetrate the carcass ply 51 in the tire width direction on the outside in the tire width direction of the bead core 60 and connects the conductive portion 52 and the chafer portion 170. Additionally, the conductive rubber portion 180 is different from the conductive rubber portion 80 of the first embodiment in that the conductive rubber portion does not penetrate the carcass ply 51 and does not connect the conductive portion 52 and the chafer portion 170 on the inside in the tire radial direction and the inside in the tire width direction of the bead core 60.

In this embodiment, the conductive path CP along which static electricity from the vehicle flows includes a path through which static electricity flows from the second chafer portion 29 to the conductive portion 52 through the conductive rubber portion 180 and a path through which static electricity flows from the second chafer portion 29 to the conductive portion 52 through the lateral covering portion 173 of the first chafer portion 171 and the conductive rubber portion 180.

The other configurations of the tire 110 are the same as the other configurations of the tire 10 of the first embodiment.

The embodiment of the present invention is not limited to the above-described embodiment, and the following configurations can also be adopted.

The conductive rubber portion is not particularly limited if the conductive rubber portion includes the embedded portion embedded in the carcass ply and has conductivity. The conductive rubber portion may not be connected to the conductive portion. The conductive rubber portion may not be connected to the chafer portion. The installation position of the embedded portion is not particularly limited if at least a part of the portion embedded in the carcass ply is located on the outside in the tire radial direction in relation to the bead core. The embedded portion may not penetrate the carcass ply. The embedded portion may not be exposed to the surface of the carcass layer. The embedded portion may not be connected to the intervening portion. The intervening portion may not be provided.

The conductive rubber portion may not penetrate the carcass ply in the tire radial direction. That is, for example, in the first embodiment, the conductive rubber portion 80 may not include the first portion 81. Further, in the first embodiment, the conductive rubber portion 80 may not include any one of the second portion 82 and the third portion 83. The shape of the conductive rubber portion is not particularly limited. For example, in the first embodiment, the conductive rubber portion 80 may be formed such that the dimension in the tire width direction at the inner portion in the tire radial direction does not increase. The conductive rubber portion may not divide the carcass rubber of the carcass ply if the conductive rubber portion penetrates the carcass ply in the tire width direction.

Further, the conductive rubber portion may be a part of the carcass rubber in the carcass ply. In this case, the carcass rubber includes a first rubber portion and a second rubber portion of which volume resistivity is smaller than that of the first rubber portion. The second rubber portion is a portion corresponding to the conductive rubber portion. The first rubber portion is a portion other than the second rubber portion in the carcass rubber. In this case, at least a part of the second rubber portion is located on the outside in the tire radial direction in relation to the bead core. Also in this case, as described above, static electricity from the vehicle is more easily released to the ground regardless of the conductivity of the carcass ply.

The conductive portion is not particularly limited if the conductive portion extends along the carcass ply so that at least a part is located between the carcass ply and the bead core and has conductivity. The conductive portion may not contain metal. The conductive portion may be made of, for example, rubber having conductivity. The conductive portion may not be a thread-shaped member and may be a layered member laminated on the carcass ply. The volume resistivity of the conductive portion may be the same as the volume resistivity of the conductive rubber portion and may be larger than the volume resistivity of the conductive rubber portion. The conductive portion may not be provided.

The chafer portion is not particularly limited if the chafer portion has conductivity and covers at least a part around the carcass ply. For example, in the first embodiment, the first chafer portion 71 may not be provided. In this case, the conductive rubber portion 80 may connect the second chafer portion 29 and the conductive portion 52. In the first embodiment, the first chafer portion 71 and the second chafer portion 29 may be integrally molded with each other. The chafer portion may not be provided.

The carcass layer may include two or more carcass plies. In this case, the conductive rubber portion penetrates the plurality of carcass plies in the tire width direction and connects the chafer portion and the conductive portion. The carcass layer may include an inner liner attached to the inner surface of the carcass ply.

The configuration of the tread portion is not particularly limited if the tread portion can allow static electricity to flow from the conductive portion extending to the tread portion to the tread surface portion.

The tire of the above-described embodiment may be used in any vehicle.

Additionally, the configurations described in the present specification can be appropriately combined within a range that does not contradict each other.

According to an aspect of the tire of the present invention, a part of the conductive rubber portion is embedded in the carcass ply. Therefore, it is possible to easily conduct electricity through the conductive rubber portion in the portion of the carcass ply in which the conductive rubber portion is embedded. Accordingly, static electricity from the vehicle can pass through the carcass ply by the conductive rubber portion even when the conductivity of the carcass ply is low. Thus, it is possible to obtain the tire having a structure in which static electricity from the vehicle can be easily released to the ground regardless of the conductivity of the carcass ply. Therefore, it is possible to preferably release static electricity of the vehicle to the ground while reducing the rolling resistance of the tire by decreasing the amount of carbon contained in the carcass rubber of the carcass ply.

The carcass ply may include a main body of which at least a part is located on the inside in a tire width direction of the bead core and a folded portion which is folded outward in the tire width direction around the bead core from the main body, and the embedded portion may include a first embedded portion embedded in the folded portion.

According to this configuration, a portion in which the conductive rubber portion is embedded in the carcass ply easily contacts the chafer portion. Accordingly, static electricity from the vehicle transmitted from the rim to the chafer portion can be easily passed through the carcass ply by the first embedded portion. Thus, static electricity from the vehicle is more preferably easily released to the ground.

The carcass ply may include a main body of which at least a part is located on the inside in a tire width direction of the bead core and a folded portion which is folded outward in the tire width direction around the bead core from the main body, and the embedded portion may include a second embedded portion embedded in the main body.

According to this configuration, a portion in which the conductive rubber portion is embedded in the carcass ply easily contacts the chafer portion. Accordingly, static electricity from the vehicle transmitted from the rim to the chafer portion can be easily passed through the carcass ply by the second embedded portion. Thus, static electricity from the vehicle is more preferably easily released to the ground.

A distance from an outer end portion of the bead core in a tire radial direction to an outer end portion of the embedded portion in the tire radial direction may be equal to or shorter than a dimension of the bead core in the tire radial direction.

According to this configuration, it is possible to decrease the volume of the conductive rubber portion.

The tire may include a conductive portion which is located between the carcass ply and the bead core and the conductive portion may be a thread-shaped member containing metal and may be connected to the conductive rubber portion.

According to this configuration, static electricity transmitted to the conductive rubber portion can be transmitted to the conductive portion. Accordingly, even when the volume resistivity of the carcass rubber in the carcass ply is relatively large and the conductivity of the carcass ply is low, static electricity from the vehicle transmitted from the rim to the chafer portion can be transmitted to the conductive portion through the conductive rubber portion. Accordingly, static electricity from the vehicle can be sent to the tread portion through the conductive portion and the static electricity can be released from the tread surface portion to the ground at the tread portion. Thus, static electricity from the vehicle is more preferably easily released to the ground.

A volume resistivity of the conductive portion may be smaller than a volume resistivity of the conductive rubber portion.

According to this configuration, the volume resistivity of the conductive portion is preferably easily decreased. Accordingly, static electricity can more preferably flow to the conductive portion that makes a relatively long conductive path CP from the bead portion to the tread portion. Thus, static electricity from the vehicle is more easily released to the ground.

The carcass ply may include a carcass rubber and a plurality of ply cords which are embedded in the carcass rubber and are arranged at intervals in a tire circumferential direction, and the embedded portion may be located between the ply cords.

According to this configuration, a part of the conductive rubber portion is easily disposed to be embedded in the carcass ply. Further, the embedded portion is easily disposed to penetrate the carcass ply and the conductive portion and the chafer portion are more preferably connected to each other by the conductive rubber portion.

Another aspect of the tire of the present invention includes a bead core which is provided in the bead portion, and a carcass ply which covers at least a part around the bead core, wherein the carcass ply includes a carcass rubber, wherein the carcass rubber includes a first rubber portion and a second rubber portion of which a volume resistivity is smaller than that of the first rubber portion, and wherein at least a part of the second rubber portion is located on the outside in a tire radial direction in relation to the bead core.

According to another aspect of the tire of the present invention, it is possible to obtain the tire having a structure in which static electricity from the vehicle is easily released to the ground regardless of the conductivity of the carcass ply as described above. Therefore, it is possible to preferably release static electricity of the vehicle to the ground while reducing the rolling resistance of the tire by decreasing the amount of carbon contained in the carcass rubber of the carcass ply.

INDUSTRIAL APPLICABILITY

By applying the tire of the present invention to the art, it is possible to provide a tire having a structure in which static electricity from a vehicle is easily released to a ground regardless of conductivity of a carcass ply.

REFERENCE SIGNS LIST

10, 110 Tire
13 Bead portion
51 Carcass ply
51*a* Carcass rubber
51*b* Ply cord
52 Conductive portion
60 Bead core
80, 180 Conductive rubber portion
82*b*, 83*b* Through-portion (i.e., embedded portion)

The invention claimed is:
1. A tire provided with a tread portion, and a bead portion, comprising:
   a bead core which is provided in the bead portion;
   a carcass ply which covers at least a part around a core axis of the bead core; and
   a conductive rubber portion which includes an embedded portion embedded in the carcass ply,
   a conductive portion which is located on an outside in a tire radial direction of the carcass ply in the tread portion, which extends along the carcass ply, and at least a part of which is located between the carcass ply and the bead core; and
   a chafer portion which has conductivity, and which covers at least a part of the carcass ply,
   wherein the carcass ply includes
      a main body of which at least a part is located on an inside in a tire width direction of the bead core, and
      a folded portion which is folded outward in the tire width direction around the bead core from the main body,
   wherein outer end portions of the conductive rubber portion in the tire radial direction are located on an inside in the tire radial direction in relation to an outer end portion of the folded portion in the tire radial direction,
   wherein the chafer portion includes lateral covering portions which cover a core covering portion of the carcass ply from both sides in the tire width direction, the core covering portion being provided in the bead portion,
   wherein outer end portions of the lateral covering portions in the tire radial direction are located on the outside in the tire radial direction in relation to an outer end portion of the bead core in the tire radial direction,
   wherein the embedded portion includes a first portion which is located between the lateral covering portions and the conductive portion in the tire width direction, and a second portion which is located on the outside in the tire radial direction in relation to the bead core and the lateral covering portions.

2. The tire according to claim 1,
wherein the embedded portion includes a first embedded portion embedded in the folded portion.

3. The tire according to claim 2,
wherein the embedded portion includes a second embedded portion embedded in the main body.

4. The tire according to claim 3,
wherein a distance from an outer end portion of the bead core in the tire radial direction to an outer end portion of the embedded portion in the tire radial direction is equal to or shorter than a dimension of the bead core in the tire radial direction.

5. The tire according to claim 3, further comprising:
wherein the conductive portion is a thread-shaped member containing metal and is connected to the conductive rubber portion.

6. The tire according to claim 3,
wherein the carcass ply includes a carcass rubber and a plurality of ply cords which are embedded in the carcass rubber and are arranged at intervals in a tire circumferential direction, and
wherein the embedded portion is located between the ply cords.

7. The tire according to claim 2,
wherein a distance from an outer end portion of the bead core in the tire radial direction to an outer end portion of the embedded portion in the tire radial direction is equal to or shorter than a dimension of the bead core in the tire radial direction.

8. The tire according to claim 2, further comprising:
wherein the conductive portion is a thread-shaped member containing metal and is connected to the conductive rubber portion.

9. The tire according to claim 8,
wherein a volume resistivity of the conductive portion is smaller than a volume resistivity of the conductive rubber portion.

10. The tire according to claim 2,
wherein the carcass ply includes a carcass rubber and a plurality of ply cords which are embedded in the carcass rubber and are arranged at intervals in a tire circumferential direction, and
wherein the embedded portion is located between the ply cords.

11. The tire according to claim 1,
wherein the embedded portion includes a second embedded portion embedded in the main body.

12. The tire according to claim 11,
wherein a distance from an outer end portion of the bead core in the tire radial direction to an outer end portion of the embedded portion in the tire radial direction is equal to or shorter than a dimension of the bead core in the tire radial direction.

13. The tire according to claim 11, further comprising:
wherein the conductive portion is a thread-shaped member containing metal and is connected to the conductive rubber portion.

14. The tire according to claim 11,
wherein the carcass ply includes a carcass rubber and a plurality of ply cords which are embedded in the carcass rubber and are arranged at intervals in a tire circumferential direction, and
wherein the embedded portion is located between the ply cords.

15. The tire according to claim 1,
wherein a distance from an outer end portion of the bead core in the tire radial direction to an outer end portion of the embedded portion in the tire radial direction is equal to or shorter than a dimension of the bead core in the tire radial direction.

16. The tire according to claim 15, further comprising:
wherein the conductive portion is a thread-shaped member containing metal and is connected to the conductive rubber portion.

17. The tire according to claim 1, further comprising:
wherein the conductive portion is a thread-shaped member containing metal and is connected to the conductive rubber portion.

18. The tire according to claim 17,
wherein a volume resistivity of the conductive portion is smaller than a volume resistivity of the conductive rubber portion.

19. The tire according to claim 1,
wherein the carcass ply includes a carcass rubber and a plurality of ply cords which are embedded in the carcass rubber and are arranged at intervals in a tire circumferential direction, and
wherein the embedded portion is located between the ply cords.

* * * * *